Figure 1:
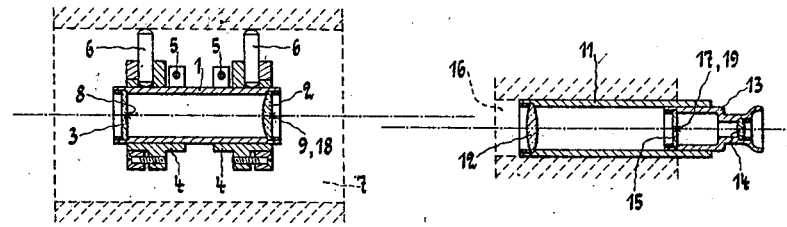

March 20, 1928. 1,662,836
A. STEINLE
METHOD OF AND DEVICE FOR TESTING THE POSITION OF TWO AXIAL DIRECTIONS
Filed Nov. 27, 1926

Inventor:
Adolf Steinle

Patented Mar. 20, 1928.

1,662,836

UNITED STATES PATENT OFFICE.

ADOLF STEINLE, OF JENA, GERMANY, ASSIGNOR TO THE FIRM: CARL ZEISS, OF JENA, GERMANY.

METHOD OF AND DEVICE FOR TESTING THE POSITION OF TWO AXIAL DIRECTIONS.

Application filed November 27, 1926, Serial No. 151,222, and in Germany November 24, 1925.

In the British patent specification 240,426 there is described a method and a device for testing the position of two axes lying in a joint plane, viz the two cases are dealt with in which, on the one hand, it solely depends on a test of the direction (direction-test) and, on the other hand, on a test of the distance apart besides the direction-test (linear test). Thereby one operates in such a way as to ascertain by means of a telescope, in which the principal axis of the entering luminous rays embraces a certain definite angle with the one axial direction, the course of a straight line which is parallel to the second axial direction. For testing the direction it is advisable to represent the straight line by the optical axis of a collimator. As is well known, such a collimator consists of a collective lens and a collimator mark, disposed in the focal length of this collective lens and denoting the optical collimator axis, which mark is imaged by the lens at a great distance. However, the use of a collimator is also possible for the linear test of an axis relatively to an axis parallel thereto and of advantage if the described method is thereby improved that the axis to be tested coincides with the collimator axis and that for testing the distance apart there is used a second mark, denoting the collimator axis. If thereby the optical telescope axis coincides with the other axial direction, the collimator mark is imaged in the image plane of the telescope, focussed on a large distance, in such a way that its image denotes the optical telescope axis if the two axes be parallel to each other, and the position of the image of the second mark in the image plane of the telescope, now focussed on this mark, indicates the distance apart of the axes.

The device used for carrying out the known method may be rendered applicable for carrying out the new method by providing a second mark which denotes the optical axis of the collimator. In this case it will be best to dispose the second mark on the collimator lens itself. In order to be able to read off directly in the telescope the distance of the axes from one another it is advisable to construct the second mark in such a way that it consists of two straight lines, intersecting perpendicularly on the optical collimator axis and being provided with longitudinal scales. If the distance between the two axes be not larger than half the diameter of the light-entrance aperture of the telescope and if the test of the position of the axes of two borings be in question, the test may be readily carried out by centrically inserting the collimator and the telescope into one of the borings each. Otherwise, one must resort to the use of a reflector system by which the imaging rays are parallelly displaced.

Figure 2:
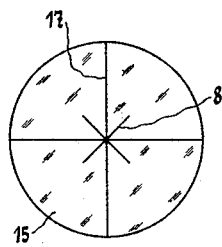
Figure 3:
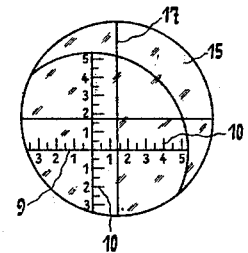

The annexed drawing shows an example of the device for carrying out the new method of testing the direction and the distance of parallel axes. Fig. 1 represents a cross section of the device, Figs. 2 and 3 as well as Figs. 4 and 5 show on an enlarged scale the image presented to the observer, when looking into the telescope, with different executions of the marks.

A collimator, consisting of a casing 1, with a plano-convex collective lens 2 and a ground glass 3 disposed in the focal plane of the latter, is provided with two sleeves 4 which are slipped on the ends of the collimator casing 1 and fastened by means of set-screws 5. In each of the two sleeves 4 there are clamped in corresponding borings three rods 6, constructed after the type of cylindrical end gauges, which rods are radially disposed at a relative angle of 120° and which support the accurately ground outer surface of the casing 1 relatively to a boring 7 in such a way that the optical axis of the collimator lens 2 coincides with the axis of the boring 7. The ground glass 3 is provided with a collimator mark 8 for denoting the focal point of the lens 2. The lens 2 carries on its plane surface a mark 9, which consists of two straight lines perpendicular to each other and which denotes by its crossing point the optical axis and the single branches of which mark are provided with longitudinal scales 10. A telescope whose casing 11 contains an objective 12 as well as an ocular tube 13, displaceable in the direction of the optical axis, with an ocular lens 14 and a mark-plate 15, fits into a second boring 16, the optical telescope axis coinciding with the axis of the boring 16. The plate 15 is provided with a mark 17, denoting the optical telescope axis and consisting of two straight lines which intersect perpendicularly.

Figure 4:
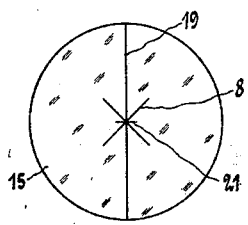
Figure 5:
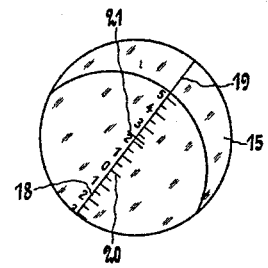

In another construction of the device corresponding to Figs. 4 and 5, the collimator mark has the shape already described of the mark 8, while the two other marks consist of a straight line each 18 and 19 respectively, which denote a diameter of the respective mark-plane and on which the point of intersection with the optical axis is indicated by the zero point of a scale 20 and a cross line 21 respectively.

In order to carry out a test it is necessary to adjust the ocular tube 13 in the telescope 11 in such a way that the collimator mark 8 is imaged in the plane of the marks 17 and 19 respectively. If one then obtains the image shown in Figs. 2 or 4, the axes of the borings 7 and 16 are parallel to one another. For in the event of an existing error of direction the point denoted by the collimator mark 8 would not fall into the crossing point of the telescope marks 17 and 19 respectively. Thereupon one displaces the ocular tube 13 until the plane surface of the collimator lens 2 appears sharp, and is then able to read off on the scales 10 and 20 respectively according to Fig. 3 the components of the distance of the axes of the borings 7 and 16 and according to Fig. 5 the distance of these axes themselves. Whilst in the first case the marks 9 and 17 must suitably be so adjusted that one straight line each forming the marks travels horizontally, it is in the second necessary to rotate the collimator and the telescope, when focussing on the plane surface of the collimator lens 2, until the two marks 18 and 19 coincide. By means of a corresponding rotation it is also possible to determine directly the axial distance with the device carried out according to Fig. 3.

I claim:

1. Method of testing the relative position of two axes destined to be parallel to each other, which method consists in so arranging a telescope containing at least one sighting mark adapted to fix the optical axis of the telescope that this optical axis coincides with one of the said two axes, so arranging a collimator comprising a lens and two marks lying on the axis of this lens, one of these marks coinciding with one of the focal points of this lens, that the axis of this lens coincides with the other of the two axes to be tested, and ascertaining within the telescope the position of the images formed within the telescope of the said two marks.

2. Device for testing the relative position of two axes destined to be parallel to each other, comprising a telescope containing at least one sighting mark adapted to fix the optical axis of the telescope, means connected with the telescope and presenting at least two straight lines parallel to the optical axis of the telescope and having the same distance from this axis, a collimator comprising a lens and two marks lying on the axis of this lens, one of these marks coinciding with one of the focal points of this lens, and means connected with the collimator and presenting at least two straight lines parallel to the axis of the said lens and having the same distance from this axis.

3. Device for testing the relative position of two axes destined to be parallel to each other, comprising a telescope containing at least one sighting mark adapted to fix the optical axis of the telescope, means connected with the telescope and presenting at least two straight lines parallel to the optical axis of the telescope and having the same distance from this axis, a collimator comprising a lens, a mark coinciding with one of the focal points of this lens, and a second mark consisting of two longitudinal scales perpendicularly intersecting on the axis of the said lens, and means connected with the collimator and presenting at least two straight lines parallel to the axis of the said lens and having the same distance from this axis.

ADOLF STEINLE.